INVENTOR
Edward Themak
BY
ATTORNEYS

Jan. 13, 1942.     E. THEMAK     2,270,152
TUBE SEALING
Filed Oct. 28, 1938     5 Sheets-Sheet 5

INVENTOR
*Edward Themak*
BY
ATTORNEYS

Patented Jan. 13, 1942

2,270,152

UNITED STATES PATENT OFFICE 2,270,152

TUBE SEALING

Edward Themak, Northport, N. Y.

Application October 28, 1938, Serial No. 237,482

29 Claims. (Cl. 226—80)

This invention relates to apparatus adapted for sealing glass tubes and has for its principal object the provision of improved automatic apparatus for sealing glass tubes such, for example, as are employed in dispensing medicinal and surgical supplies.

Surgical sutures and ligatures, for example, ordinarily are dispensed sealed in sterilized form in a glass tube containing a sterile liquid. It has heretofore been customary to seal such sutures or ligatures in a glass tube by a manual sealing operation, but this mode of sealing the tubes, although commonly practiced for want of a better one, is unsatisfactory because of the extreme difficulty of securing a product of uniform quality. If the liquid in the tube is particularly volatile (alcohol, for example) the vapor pressure generated in the tube by the heat of the sealing flame frequently causes the soft glass at the seal to blow, producing a bulge of thin weak glass at the place of the seal, unless the tube is manipulated exactly right during sealing. As a result of this and other difficulties even skilled workers are unable to seal a very high percentage of tubes in a manner that will pass the rigid inspection to which the tubes after sealing are subjected, and many hand-sealed tubes must be rejected because of weakness or other fault of the seal.

The present invention provides an apparatus adapted for automatically sealing glass tubes which is capable of making more uniform seals than it is possible to make by hand, and which will produce a very high percentage of sealed tubes capable of passing even the most rigid inspection requirements.

The invention provides apparatus for sealing glass tubes comprising tube receiving means, a burner, and means for bringing the tube receiving means and the burner into sealing position relatively to one another and for holding them into such relative position for a sufficient period of time to effect sealing of a tube positioned in said tube receiving means. In addition, means (advantageously vertically movable means) are provided for gripping and drawing off the upper end of a tube positioned in the tube receiving means after the tube receiving means has been in sealing position relatively to the burner for a sufficient period of time for a tube in the tube receiving means to have become softened. Means are also provided for causing relative axial rotation between the main body portion of the tube and the portion thereof gripped in the gripping means as the latter portion is drawn from the former portion in effecting sealing of the tube. Advantageously this relative axial rotation is achieved by means for rotating the main body portion of the tube in the tube receiving means while it is in sealing position before the burner, and by the provision of gripping means which serve to hold the upper portion of the tube gripped therein from rotation as it is drawn off from the rotating main body portion of the tube in effecting sealing thereof.

The gripping means advantageously comprises a chuck, means for causing the chuck to grip the upper end of a tube positioned in the tube receiving means, and means for causing the chuck to draw off the upper end of such tube while the tube receiving means is in sealing position relatively to the burner, but only after the tube receiving means has been in such position for a sufficient period of time for a tube therein to have become softened.

More particularly, an advantageous form of the apparatus of the invention comprises a tube receptacle adapted to receive a tube to be sealed, and a burner for heating a tube positioned therein to effect sealing of the tube. Means are provided for advancing the tube receptacle into position before the burner, for holding the tube in such position for a sufficient period of time for sealing a tube positioned in the receptacle, and for withdrawing the tube receptacle and the sealed tube therein from before the burner. Advantageously these means comprise a chain drive mechanism such, for example, as a sprocket chain supported by suitable sprocket wheels, to which the tube receptacle or receptacles are connected. The chain drive mechanism or other tube actuating means is driven by a suitable drive mechanism arranged to impart intermittent motion thereto for the purpose of advancing the tubes in the manner described.

In the preferred embodiment of the apparatus of the invention, a plurality of tube receptacles are connected to a sprocket chain drive mechanism and a plurality of burners are employed. The tube receptacles are arranged in groups of a number equal to the number of burners employed, and a plurality of such groups of tube receptacles advantageously are connected at intervals to the chain drive mechanism.

The apparatus includes means for rotating tubes positioned in the receptacles when the receptacles are in position before the burners in order that the glass tubes may be heated uniformly around the point at which they are to be sealed, thus to insure production of uniform seals. These means advantageously are in the form of a belt adapted to engage frictionally with tubes positioned in the tube receptacles when the tube receptacles are in position before the burners, together with means for actuating the belt in a manner to rotate the tubes. An especially satisfactory form of belt for thus rotating the tubes comprises an endless belt mounted on suitably positioned pulleys, the belt having a facing of relatively soft elastic material adapted to bear firmly against tubes positioned in receptacles when the receptacles are in position before the burners. The belt mechanism is driven through one of the supporting pulleys.

An important feature of the apparatus of the invention is the provision of means for gripping the ends of tubes to be sealed and for pulling such ends in a direction away from the main body of the tube, after the tube has been softened sufficiently by the heat of the burner flame, in a manner to draw or "neck" the tube adjacent the zone of the seal. In a preferred apparatus according to the invention the tube receptacles are so arranged as to carry the tubes in a vertical position, and in such apparatus the gripping means referred to comprises a chuck positioned above tube receptacles in position before the burners. The chuck in this case is mounted for vertical movement in alignment with receptacles in position before the burners, and cam drive means are provided to impart such vertical movement to the chuck. The cam drive means for the chuck is geared to and timed with the chain drive mechanism for the tube receptacles in a manner to insure operation of the chuck in timed relation with the operation of the chain drive mechanism and the related motion of the tube receptacles.

The chuck is preferably so constructed and operated as to move downwardly over the upper ends of tubes positioned in receptacles held before the burners while the tubes are still relatively cool, and to grip said ends only after the glass has been softened sufficiently to permit drawing. After gripping the upper ends of the tubes, the chuck is moved upwardly by its cam actuating means in a manner to draw the heated portion of the tubes. To enable this mode of operation, the chuck preferably comprises a stationary guide plate, a chuck back plate mounted for vertical motion on the guide plate, and a chuck front plate hingedly connected to the chuck back plate and movable therewith. The chuck front and back plates are provided with complementary chuck jaws for gripping the ends of the tubes. Spring means are provided to urge the chuck front and back plates toward each other in a manner to close the chuck jaws, and means are provided for opening the jaws of the chuck as the chuck moves downwardly over the ends of the tubes. These means are arranged so as to release the chuck jaws from the opened position at the proper time for gripping the tube ends.

As the chuck is moved upwardly after gripping the tube upper ends, the main portions of the tubes in the receptacles continue to be rotated, as indicated above, but the upper ends of the tubes gripped in the chuck are held from rotation. Consequently, the drawn portion of the tubes is twisted as the chuck moves upwardly and the twisted portion is severed from the main portion of the tube by the burner flame as the sealing operation is completed.

Means are provided to release the severed ends of the tubes from the chuck. These means advantageously take the form of a stationary cam or wedge adapted to open the jaws of the chuck as the chuck reaches the upper limit of its travel. A receptacle for catching the severed ends of the tubes as they are released from the chuck is provided in order to prevent such severed ends from dropping into the operating mechanism. The receptacle is mounted for reciprocal motion into and out of position under the chuck and is actuated by a suitable cam appropriately geared to the chuck cam actuating means in a manner to insure proper timed motion of the receptacle with respect to the chuck.

Means are provided for elevating the burners during the course of the sealing operation to insure proper heating of the drawn portions of the tubes being sealed and to insure smooth and uniform sealing of the tubes.

A fire screen adapted to be raised and lowered before the burner or burners is provided to protect the metal parts of the machine from the burner flame during withdrawal of sealed tubes from position before the burners and advancement of tubes to be sealed into position before the burners. Operation of the fire screen, and elevation of the burners as well, is accomplished by means of a cam acting through suitable levers and operating in timed relation with other moving parts of the machine.

The apparatus of the invention will be better understood from the following detailed description of a preferred embodiment of the new machine considered in connection with the accompanying drawings in which—

In the preferred embodiment of the apparatus as shown in the drawings, a plurality of tube receptacles 20, each adapted to receive a tube to be sealed, are provided. The tube receptacles 20 are arranged in a plurality of groups (6 groups of 6 tube receptacles each are shown in the drawings) and are carried by an endless sprocket chain 21 which is mounted on a pair of spaced sprocket wheels 22 and 23.

Each of the tube receptacles 20 (Figs. 9 and 11) advantageously is formed from a block of a suitable metal such, for example, as aluminum and is machined in a manner to provide a back portion 24 and one or more front portions 25 (advantageously two such front portions as shown in the drawings). The front portion or portions 25 are recessed with respect to the back portion 24 so as to provide a recess 26 in which a mid portion of a tube T mounted in the receptacle is exposed. Each tube receptacle is formed with a tube receiving opening 27 extending therethrough, the tube receiving opening 27 being of a diameter somewhat greater than that of the largest tube intended to be received. The tube receiving opening 27 extends through the tube receptacle in a direction normal to the general direction of the recess 26, and advantageously is formed approximately midway between the front and back portions 24 and 25 of the tube receptacle. Annular ball bearings 28 advantageously are fitted in the tube receptacles at each end of the tube receiving opening 27. The inner diameter of these bearings 28 preferably is slightly less than the diameter of the tube receiving opening 27, although such inner diameter still is larger than the diameter of the largest tube intended to be received. The bearings 28 thus are adapted to receive a tube to be sealed and to permit its free rotation when positioned in the receptacle.

Supporting brackets 29 are secured to the back portion 24 of the tube receptacle for the purpose of mounting the receptacle on the sprocket chain 21. Preferably the brackets 29 are set in a vertical groove 30 machined in the back portion of the tube receptacle in order to minimize the chance of the tube receptacle twisting on its brackets out of alignment with the sprocket chain. The brackets 29 are spaced apart a distance corresponding to the width of the sprocket chain and are suitably drilled to receive and to be held in place by a pin 31 connecting adjacent links 32 of the sprocket chain.

The sprocket chain 21 and the tube receptacles 20 carried thereby are mounted a short distance above the surface of a table 33 which supports the bottoms of tubes positioned in the receptacles and along which tubes in the receptacles slide during actuation of the chain 21.

A plurality of burners 34, preferably equal in number to the number of tube receptacles in each group thereof, are mounted in a position such that the tube receptacles may be advanced successively into position before the burners 34, may be held there for a sufficient period of time to effect sealing of tubes T positioned in the receptacles, and may then be withdrawn from position before the burners. In order thus to move the tube receptacles, means are provided for imparting intermittent motion to the sprocket chain. To this end the shaft 35 on which one of the sprocket wheels 23 is mounted is provided with a gear 36 engaging a corresponding gear 37 mounted on an intermittent motion drive shaft 38. The intermittent motion drive shaft 38 also carries the gear member 39 of a Geneva movement. The pin 40 and stop cam 41 of the Geneva movement are carried on a continuously rotating main drive shaft 42 which advantageously is the output shaft of a gear reducing box 43 of standard construction. The gear reducing box 43 is provided with an input shaft 44 which is suitably connected to an electric motor or other source of mechanical power (not shown).

Upon rotation of the input shaft 44 of the gear box 43, the main drive shaft 42 will be rotated continuously and through the Geneva movement will impart intermittent rotation to the intermittent motion drive shaft 38, which in turn drives the sprocket chain intermittently through the engaging gears 36 and 37. The gear ratio between the gears 36 and 37 is such that each actuation of the gear member 39 of the Geneva motion will advance the sprocket chain 21 the distance required to withdraw one group of tube receptacles 20 from properly aligned position before the burners 34 and to advance the next successive group of tube receptacles 20 into position in proper alignment before the burners. Thus with the four-tooth gear Geneva movement shown, the gear ratio between the gears 36 and 37 should be such that a quarter revolution of the intermittent motion drive shaft 38 advances the sprocket chain 21 the proper distance, as indicated.

The speed at which the main drive shaft 42 is operated is governed by the length of time necessary to effect sealing of the tubes. The main drive shaft 42 should operate at a speed such that the stop cam 41 of the Geneva movement holds the gear member 39 thereof against rotation for the time required to complete the sealing operation being performed on the machine.

Means are provided in order that tubes in the tube receptacles before the burners may be rotated during the sealing operation, thereby to insure uniform heating about the circumference of the tubes being sealed. These means comprise a belt 45 mounted in such manner as to engage frictionally with tubes positioned in the tube receptacles before the burners. The belt 45 advantageously is an endless V-belt carried by suitable V-pulleys 46 and 47. The belt 45 (Fig. 9) is provided with a facing 48 secured to the periphery thereof, the facing 48 being of relatively soft elastic material which is readily compressible in a manner to engage frictionally with exposed surfaces of tubes in the tube receptacles. A live gum rubber is an especially satisfactory material for this facing.

The pulleys 46 and 47 which carry the V-belt 45 are mounted in a manner such that the facing 48 of the belt 45 enters the recesses 26 of the tube receptacles 20 in position before the burners and presses firmly against the exposed surfaces of the tubes mounted in such receptacles. With a suitable live rubber facing 48, firm frictional engagement with each of the several tubes positioned in a group of receptacles may be obtained regardless of substantial variations (such as normally occur) in the diameter of the glass tubes. Motion of the V-belt 45 causes the tubes in the receptacles aligned before the burners to be rotated, owing to the frictional engagement of the facing 48 on the belt with the surfaces of the tubes exposed in the recesses 26.

In order to actuate the V-belt 45, a drive pulley 49 is mounted on the shaft 50 (journaled at its lower end in a bearing 51 supported by a frame member 52) which carries one of the pulleys 47 supporting the V-belt 45. The drive pulley 49 is connected by means of a belt 53 to a pulley 54 mounted on the main drive shaft 42. Thus the tube rotating mechanism is continuously driven from the main drive shaft 42, so that tubes in position before the burners are continuously rotated during the sealing operation.

An important feature of the apparatus of the invention is the provision of means for gripping the upper ends of tubes positioned in receptacles in alignment before the burners, and for drawing or "necking" the tubes after they have been sufficiently softened by the heat of the burner flame. In the preferred embodiment of the new machine as shown in the drawings, these means comprise a chuck assembly 55 mounted for vertical motion in alignment with tubes positioned in the tube receptacles before the burners.

The chuck assembly 55 comprises a stationary guide plate 56 suitably mounted on a frame member 57 which is supported on posts 58 secured to the table 33. A chuck back plate 59 is mounted on the guide plate 56 for vertical motion in alignment with tubes positioned in receptacles aligned before the burners. A chuck front plate 60 is hingedly connected by means of pivot pins 61 to the chuck back plate and moves vertically therewith.

For the purpose of imparting vertical motion to the chuck front and back plates, a pin 62 carrying a cam roller 63 is secured to the chuck back plate 59 and projects through a slot 64 formed in the guide plate 56. The cam roller 63 engages a cam 65 mounted on a cam shaft 66 supported in bearings mounted on the frame member 57. The cam shaft 66 carries a spiral gear 67 engaging a corresponding spiral gear 68 mounted on a vertical cam drive shaft 69. The cam drive shaft 69 carries at its lower end a second spiral gear 70 engaging a corresponding spiral gear 71 mounted on a transmission shaft 72. The transmission shaft 72 is supported in suitable bearings 73 mounted on the frame member 52 and is provided with a bevel gear 74 in engagement with a corresponding bevel gear 75 mounted on the main drive shaft 42. The cam shaft 66 thus is driven continuously from the continuously rotating main drive shaft 42, and by virtue of the geared connections between these two shafts and the geared connection between the main drive shaft and the sprocket chain, the cam shaft 66 operates in timed relation with the sprocket chain. By employing a one-to-one gear ratio between the engaging bevel gears 74 and 75, the engaging spiral gears 70 and 71, and the engaging spiral gears 67 and 68, the cam shaft is caused to make one revolution for each revolution of the main drive shaft 42 and hence for each actuation of the gear member 49 of the Geneva motion through which the sprocket chain 21 is driven. Such gear ratios make it easy to design a cam 65 adapted to operate the chuck assembly 55 through one complete cycle for each actuation of the sprocket chain 21.

The chuck assembly 55 is shown in detail in Figs. 5 to 8. The stationary guide plate 56 is provided with parallel flanges 76 at its side edges. The chuck back plate 59 is provided at its side edges with runners 77 spaced apart a distance substantially equal to the distance between the flanges 76 of the guide plate, and of a depth substantially equal to the depth of the flanges 76. The chuck back plate is mounted with its runners 77 received between the guide plate flanges 76 and is held in place by gibs 78 secured by screws 79 to these flanges. The chuck back plate 59 thus is mounted for vertical motion in guides formed by the flanges 76 and gibs 78.

Hinge brackets 80 project outwardly from the chuck back plate, and the chuck front plate 60 is formed with recesses 81 permitting it to be received between the hinge brackets 80. Hinge bolts 61 extending through the hinge brackets 80 and into the body of the chuck front plate hingedly secure the chuck front plate to the chuck back plate.

Suitable complementary chuck jaws are provided in the chuck back plate 59 and in the chuck front plate 60. In the preferred embodiment of the machine, a plurality of such complementary chuck jaws are provided spaced apart a distance substantially equal to the spacing of the tube receiving openings in each group of tube receptacles 20 on the sprocket chain 21.

The chuck jaws provided in the chuck back plate 59 each comprise a jaw block 82 fitted in a recess 83 formed in the lower edge of the chuck back plate. A pin 84 is secured to the jaw block 82 and projects through a hole extending through the chuck back plate adjacent the recess 83 therein. A coil spring 85 surrounding the pin 84 between the chuck back plate 59 and the jaw block 82 urges the jaw block 82 outwardly from the chuck back plate, the outward travel of the jaw block 82 being limited by a head 86 formed on the pin 84.

The complementary chuck jaws provided in the chuck front plate each comprise a jaw block 87 fitted within a recess 88 formed in the lower edge of the chuck front plate 60 and secured to a flat spring 89 that in turn is suitably secured to the chuck front plate 60. The flat spring 89 is tensioned in a manner to resist movement of the jaw block 87 secured thereto in a direction away from the complementary jaw block 82 in the chuck back plate.

Adjacent surfaces of the jaw blocks 82 and 87 are curved concavely with a radius slightly greater than the radius of the largest tube intended to be sealed on the machine. The center line spacing between adjacent surfaces of the jaw blocks 82 and 87, however, is considerably less than twice the radius of curvature of the adjacent concave surfaces and is such as to permit the jaws to grip the smallest tube intended to be sealed in the machine. This configuration of the chuck jaw blocks 82 and 87, and the action of the coil springs 85 and the flat springs 89, enables the chuck jaws to grip tubes varying considerably in diameter.

The lower edges of the curved faces of the jaw blocks 82 and 87 are beveled so as to facilitate initial engagement of the jaws with tubes to be gripped. Such beveling is especially important in the case of the jaw blocks 82 in the chuck back plate, for these jaw blocks are urged outwardly by the springs 85 in a manner to overlie the rearmost portion of tubes in the receptacles aligned before the burners, the beveled lower edges enable the jaw blocks 82 to be displaced rearwardly as they make contact with the upper ends of the tubes during downward movement of chuck. The tubes T in the receptacles 20 are of course pressed toward the rear of the tube-receiving openings 27 by the tube-rotating belt 45.

A thrust plate 90 is screwed or otherwise secured to the stationary guide plate 56 on which the chuck back plate is mounted. Coil springs 91 bear against the thrust plate and extend into the spring receiving openings 92 formed in the chuck back plate. The springs 91 press the chuck back plate downwardly so that the cam roller 63 on the pin 62 secured to the chuck back plate 59 is held firmly in engagement with the cam 65. Pins 93 secured to the thrust plate 90 and extending into the coils of the springs 91 serve as guides for the upper ends of the springs 93 when the chuck approaches its lower limit of travel.

Means are provided to effect automatic opening and closing of the chuck jaws at appropriate points in its cycle of downward and upward motion. Closing of the jaws is effected at all times by means of compression springs 94. The springs 94 are each coiled about a pin 95 secured to the chuck back plate and extending through suitable openings formed in the chuck front plate. The springs press against the outer surfaces of the chuck front plate 60 and against adjustable thrust nuts 97 screwed on the outer ends of the pins 95. The position of the springs 94 is below the hinge pins 61 by which the chuck front plate is connected to the chuck back plate, and hence these springs continually urge the chuck front plate toward the chuck back plate in a manner to close the chuck jaws.

In the preferred chuck shown in the drawings, it is desirable to have the chuck jaws opened as the chuck moves downwardly and to have the jaws remain open until the chuck reaches substantially its lowermost limit of travel with the jaws enclosing but not gripping the upper ends of tubes mounted in the receptacles. Then as the chuck moves upwardly, it should close to grip the upper ends of such tubes, and should remain closed so as to draw the heated portion of the tubes during the sealing operation, and to withdraw the upper ends of the tubes after they have been severed from the tube bodies. As the chuck approaches the upper limit of its travel, the chuck jaws should be opened in order to release the severed ends of the tubes.

Means are provided to accomplish opening and closing of the chuck as outlined above. With the chuck in an elevated position, its jaws are held closed, as indicated above, by means of the springs 94. The means provided to open the chuck as it moves downwardly comprise a dog 98 pivotally mounted in a slot 99 formed in the stationary guide plate 56 of the chuck assembly. The slot 99 preferably is just sufficiently wide to receive the dog 98 and to permit it to rotate on its pivotal mounting, without permitting substantial movement in a direction axial with respect to the pivot. The dog 98 projects slightly beyond the forward surface of the guide plate 56 against which the chuck back plate 59 bears, and enters a groove 100 formed in the chuck back plate in vertical alignment with the dog 98. The projecting end of the dog 98 is provided with a sloping cam surface 101.

Figures 7, 8, 9, 10, 11:
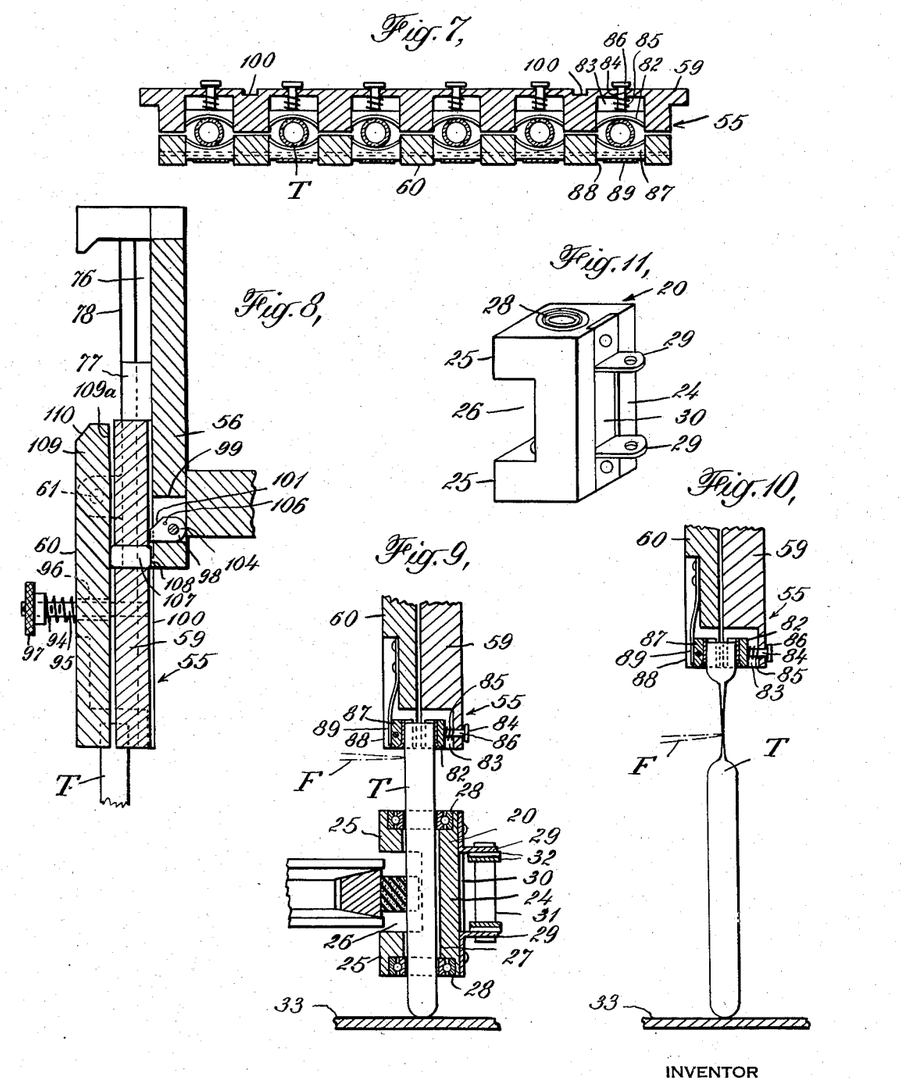
Fig. 7 is a cross-section through the chuck taken substantially along the line 7—7 of Fig. 5.
Fig. 8 is a cross-section taken substantially along the line 8—8 of Fig. 5.
Fig. 9 is a cross-section through a chuck jaw and a tube receptacle, showing the manner in which a tube to be sealed is held in the tube receptacle and is gripped by the chuck jaws.
Fig. 10 is a partially diagrammatic view of a tube gripped in the chuck jaws and in process of being sealed.
Fig. 11 is a perspective view of a tube receptacle.

The pivotal mounting for the dog 98 comprises a bolt 102 having an enlarged threaded section 103 adjacent its head and a pin section 104 of reduced diameter adjacent its outer extremity. The threaded section 103 of the bolt engages in a suitably tapped hole extending inwardly from the side edge of the guide plate 56, and the pin section 104 of the bolt passes through a suitable pivot hole formed in the dog 98, thus providing a pivot axis for the dog. A coil spring 105 surrounding the pin section 104 of the bolt between the threaded portion 103 thereof and the dog 98 is suitably held against rotation at its end adjacent the threaded portion 103 of the bolt (as by projection of its end into a suitable hole formed in the guide plate 56 or in the bolt 102), and its other end is fitted into a suitable hole 106 in the disc 98. The spring 105 is tortionally tensioned in a manner to urge the disc 98 about its axis of pivot so as to enter the groove 100 formed in the chuck back plate and to lie against the lower edge of the slot 99, as shown in Fig. 8.

A pin 107 is fitted for free axial movement in a suitable hole formed in the chuck back plate in alignment with the groove 100. The mounting of the pin 107 is such as to permit it to move axially into and out of the groove 100. The length of the pin 107 advantageously is about equal to the overall thickness of the chuck plate 59, so that at all times it bears against the chuck front plate 60. When the pin is pressed axially out of the groove 100 toward the chuck front plate 60, the latter is forced outwardly about its hinged connection to the chuck back plate against the pressure asserted by the springs 94 in a manner to cause the chuck jaws to open, and when the pin 107 moves axially into the groove 100 it permits the springs 94 to press the chuck front plate toward the chuck back plate in a manner to close the chuck jaws.

The mechanism just described operates as follows: With the chuck in an elevated position, the springs 94 press the chuck front plate to a closed position with respect to the chuck back plate and cause the pins 107 to project into the grooves 100 toward the chuck back plate 56. As the chuck moves downwardly, the pins 107 engage the sloping cam surfaces 101 of the dogs 98, and since the dogs are held against downward rotation about their pivot axes by the bottom walls of the slots 99, the pins 107 are pressed axially out of the grooves and against the chuck front plate in a manner to cause the chuck jaws to open against the force exerted by the springs 94. When the chuck has moved downwardly to such an extent that the pins 107 lie completely below the dogs 98, the chuck jaws are still held open by engagement of the pins with projections 108 extending from the lower portion of the guide plate 56 into the grooves 100. The projections 108 do not project quite as far into the grooves as do the projecting ends of the dogs 98, but they do project sufficiently far to hold the pin substantially out of the grooves 100 and thereby to hold the chuck jaws open.

As the chuck begins to move upwardly the inner ends of the pins 107 engage the lower edges of the dogs 98, forcing the dogs to rotate upwardly about their pivot axes and out of the way of the pins 107. When the chuck has risen to an extent such that the pins have passed above the projections 108, there is nothing to hold the chuck jaws open and they are therefore pressed closed by the springs 94. As the chuck continues to rise and the pins 107 pass above the dogs 98, the tortionally tensioned springs 105 rotate the dogs 98 downwardly about their pivots into position for the next downward movement of the chuck.

It is apparent from the foregoing that after the chuck jaws have been opened during downward movement of the chuck, they are held open until the chuck reaches its downward limit of movement and until it has completed a small part of its upward travel. The extent to which the chuck must rise before the jaws close is governed by the vertical width of the pins 107 and the distance by which the pins underlie the dogs 98 when the chuck is at its lower limit of travel. By making the pins 107 of narrow vertical width and positioning them so that they but barely underlie the dogs 98 when the chuck is at the lowest point in its travel, the distance through which the chuck travels upwardly before the chuck jaws close can be made very small. By eliminating the projections 108 at the lower edge of the guide plate 56, it is possible to have the chuck jaws close as soon as (or slightly before) the chuck reached the lower limit of its travel, but such an arrangement is apt to allow the chuck jaws to close too soon and damage the tubes to be sealed. In general it is preferred, as provided for by the mechanism described, to have the chuck jaws close as the chuck is moving upwardly from the bottom of its stroke.

The point in the downward motion of the chuck at which the chuck jaws begin to open is governed by the vertical width of the dogs 98. The greater the width of the dogs, the sooner will the chuck jaws begin to open, and the less the downward slope of the cam or wedge surfaces 101 of the dogs 98, the sooner will the opening of the jaws be completed.

To open the chuck jaws when the chuck approaches the upper limit of its travel, in order to release the severed ends of the sealed tubes, the chuck front plate 60 is provided at its upper edge with upwardly extending projections 109, which projections are formed with sloping cam or wedge surfaces 110. Cam blocks 111 are secured to the upper edge of the guide plate 56 in a manner to project forwardly and overlies the upwardly extending projections 109 on the chuck front plate. The cam blocks 111 are provided with cam or wedge surfaces 112 corresponding to the cam surfaces 110 of the upwardly extending projections 109. The cam surfaces 112 of the cam blocks 111 are formed to lie inwardly toward the guide plate 56 with respect to the cam surfaces 110 of the projections 109 on the chuck front plate 60.

As the chuck approaches its upper limit of travel, the cam surfaces 110 and 112 engage. With continued upward motion of the chuck to its upper limit of travel, the projections 109 on the chuck front plate are drawn inwardly toward the chuck back plate in a manner to cause the chuck front plate to swing outwardly about its hinged connection to the chuck back plate, against the pressure of the springs 94, thereby to open the chuck jaws and release severed tube ends gripped therein. The inner surfaces 109a of the projections 109 on the chuck front plate are sloped outwardly and upwardly in a manner to permit free operations of the chuck opening mechanism.

Figure 1:
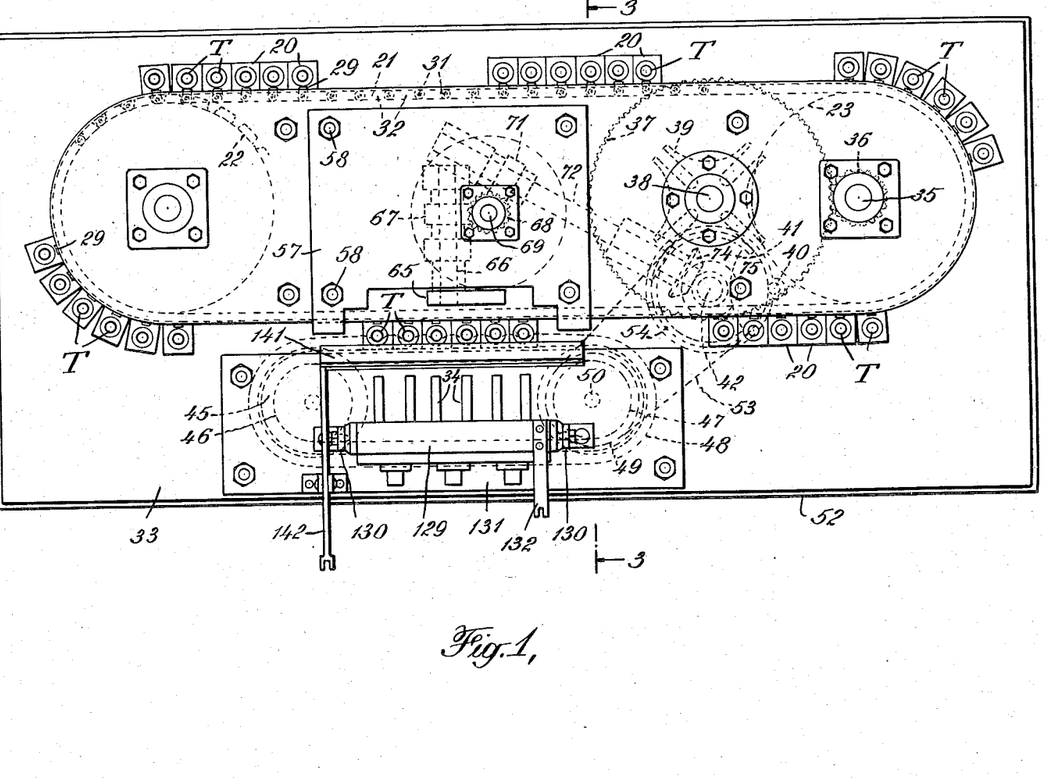
Fig. 1 is a plan view of the new machine with the chuck assembly removed.
Figure 2:
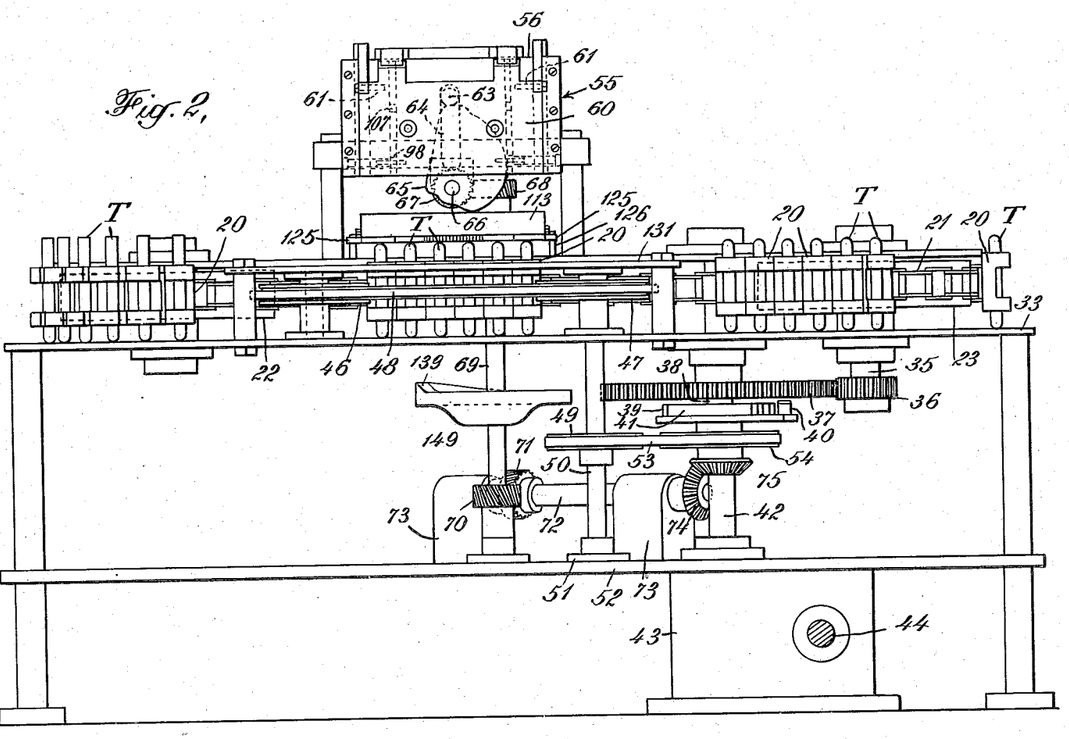
Fig. 2 is an elevation of the new machine with the burner and fire screen mechanism removed.
Figure 3:
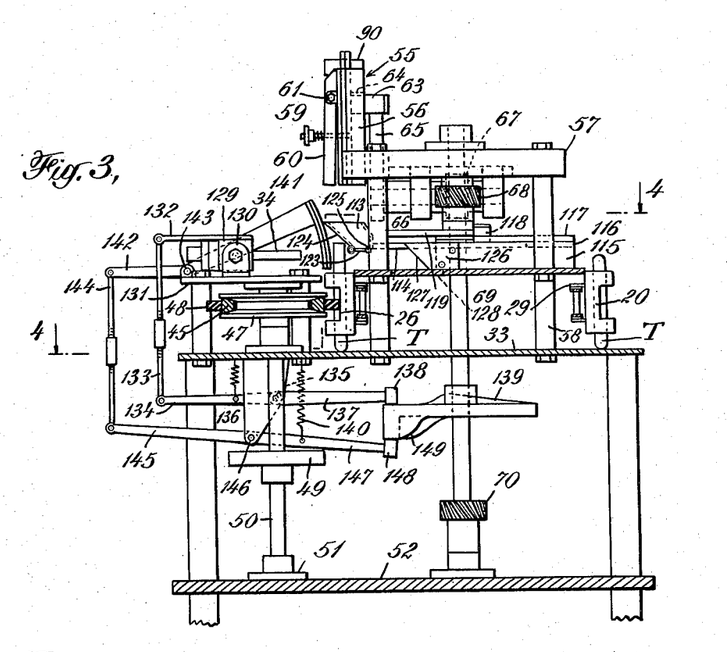
Fig. 3 is a cross-section through the new machine taken substantially along the line 3—3 of Fig. 1.
Figure 4:
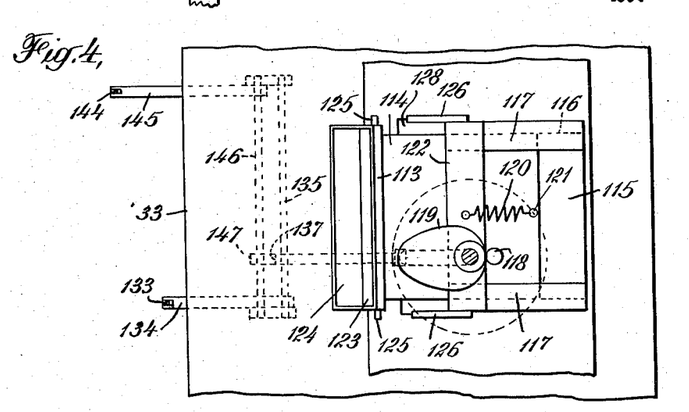
Fig. 4 is a sectional view taken substantially along the line 4—4 of Fig. 3.
Figure 5:
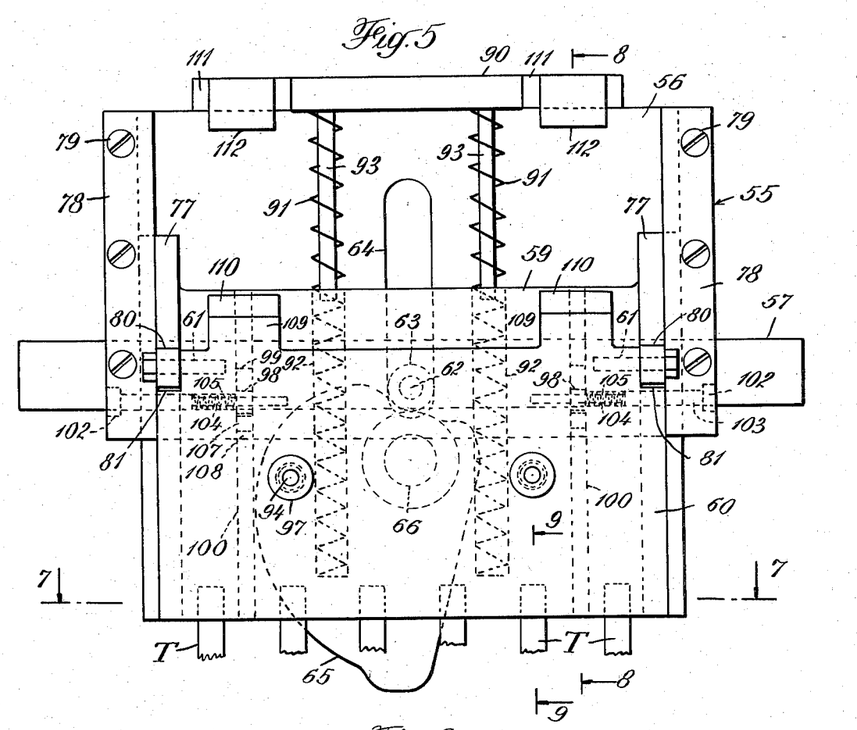
Fig. 5 is an elevation of the chuck assembly of the new machine.
Figure 6:
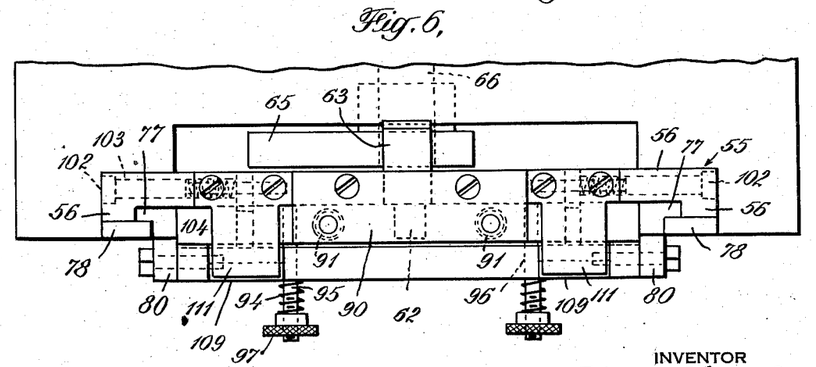
Fig. 6 is a plan of the chuck assembly shown in Fig. 5.

Means are provided to catch the severed ends of sealed tubes when the chuck jaws are opened at the upper limit of the chuck's travel, in order to avoid the danger of having these severed ends fall into and damage operating parts of the mechanism. These means (Figs. 3 and 4) comprise a receptacle 113 arranged for reciprocal motion into and out of position under the chuck. The receptacle 113 is mounted on a carriage plate 114 which in turn is mounted for sliding motion on a guide plate 115. The guide plate 115 advantageously is provided with flanges 116 of a height substantially equal to the thickness of the receptacle carriage plate 114. Gibs 117 suitably secured to the flanges 116 and projecting inwardly over the receptacle carriage plate 114 hold the carriage plate in position on the guide plate.

A pin carrying a cam roller 118 is secured to the carriage plate 114 with the cam roller 118 bearing against a cam 119 mounted on the cam drive shaft 69. A tension spring 120 secured at one end to a pin 121 carried by the receptacle carriage 114 and secured at its other end to a fixed bar 122 mounted on the gibs 117 (or on a suitable frame member) urges the carriage 114 forward in a manner to hold the cam roller 118 in contact with the cam 119.

The cam 119, being mounted on the cam shaft 69, makes one revolution for each complete cycle of operation of the chuck assembly 55. The cam 119 is therefore easily configured in a manner to cause the receptacle 113 and its carriage 114 to advance into position under the chuck as the chuck approaches its upper limit of travel, and to retreat from under the chuck as the chuck begins to move downwardly. Advance of the receptacle and carriage is of course effected by the force exerted by the spring 120, and retreat of the receptacle and carriage is brought about by operation of the cam 119 against the cam roller 118. As the chuck assembly 55 approaches its upper limit of travel, the receptacle 113 on the carriage 114 advances into position under the chuck, and in that position catches the severed tube ends when the chuck jaws are opened at the upper limit of the chuck's travel. The receptacle 113 then retreats from this advanced position, carrying with it the severed ends of the tubes.

In order to discharge the severed tube ends from the receptacle, the receptacle 113 is provided with a bottom plate 123 hingedly connected to the front wall 124 of the receptacle. The so-hinged bottom plate 123 of the receptacle is normally held in a closed position by suitable springs (not shown), and is provided with pins 125 mounted on the side edges thereof behind the hinged connection to the receptacle front wall 124. Cam plates 126 are mounted on the guide plate 115 supporting the receptacle carriage 114, and are provided with sloping cam surfaces 127 positioned to engage the pins 125 mounted on the receptacle bottom plate 123. As the receptacle 113 and carriage 114 retreat from position under the chuck assembly 55, the pins 125 on the receptacle bottom plate engage with the cam surfaces 127 of the cam plates 126 and the receptacle bottom plate 123 is thereby pressed open against the force of the springs normally holding it closed. The severed tube ends thereupon drop from the receptacle and through an opening 128 formed in the frame member supporting the carriage 114 and its guide plate 115 into a waste basket or chute (not shown). Thus the severed ends of the sealed tubes are effectively disposed of and prevented from falling into operating parts of the machine.

As indicated above, means are provided for tilting the burners 34 in a manner to heat drawn portions of tubes being sealed, thereby to insure formation of smooth and uniform seals. To this end the burners 34 are mounted on a suitable burner block 129 (which advantageously may be in the form of a manifold through which gas is admitted to the burners), and the block 129 in turn is pivotally mounted on suitable brackets 130 supported by a burner table 131. The mounting of the burners in the block 129, and of the block in the brackets 130, is such as to enable the burners to be swung through a small arc in a vertical plane. An arm 132 is bolted or otherwise secured to the block 129 on which the burners are mounted. An adjustable connecting rod 133 and an arm 134 are provided to connect the arm 132 to a rocking shaft 135. The rocking shaft 135 is pivotally mounted at either end in suitable brackets 136 supported from the under surface of the table 33. Secured to the rocking shaft 135 is a cam rocker arm 137 which carries at its outer end a cam roller 138 bearing against the surface of a cam 139 mounted on the cam drive shaft 69. A tension spring 140 is connected at one end to the arm 134 and at the other end to a stationary support (advantageously the under surface of the table 33) in a manner to urge the cam rocker arm 137 toward the surface of the cam 139.

As the cam 139 rotates with the cam drive shaft 69, the cam rocker arm 137 is actuated in a manner to cause the burner block 129 to rock about its axis of pivot and thus to elevate and lower the burners mounted in the block 129. Since the cam 139 is mounted on the cam drive shaft 69, it makes one revolution for each complete cycle of operation of the chuck assembly 55. The cam 139 is therefore easily configured in a manner to cause the burners 34 to be elevated and lowered in timed relation with the operation of the chuck assembly.

Advantageously, configuration of the cam 139 is such that the burners are maintained in a lowered position when tubes to be sealed are first moved into position before the burners so that the flames initially play squarely against the surface of such tubes. Then as the chuck grips the upper ends of the tubes and begins to draw the heated portion thereof, the cam 139 preferably should cause the burners to be elevated slowly so that the burner flames F play against drawn portions of the tubes, as illustrated diagrammatically in Fig. 10. Proper elevation of the burners at this stage of the sealing operation is important to obtain a good seal. The elevation of the burners should be sufficient to withdraw the burner flame F from the main body of the tube, else a long tubular filament will be drawn from the tube as the chuck moves upwardly and complete closure of the tube may thereby be prevented. On the other hand, the burners should not be elevated so much as sever the drawn portion of the tube very far above the main body of the tube, or too much glass will be left in the tip, with the result that an excessively thick button of glass will be formed on the sealed end of the tube. Such an excessively thick button is apt to crack from the main body of the sealed tube. As the upper ends of the tubes are severed from the main portion thereof and as the sealing operation thus approaches completion, the cam 139 causes the burners to drop slowly back to the lowered position, whereby the tips of the sealed tubes are heated and caused to flow into the form of a smoothly rounded sealed end. A small button of glass may thus be formed on the seal as the tip melts down, but a small button that is not greately thicker than the tube walls and is less in diameter than the tube is not objectionable.

Although it is preferred to configure the cam 139 in a manner to effect operation of the burners as described above, it is, of course, possible to configure the cam 139 in any manner to effect any other desired operation of the burners 34.

In order to protect the metal parts of the machine from the heat of the burner flames during the intervals between actual sealing operations, a fire screen or shield 141 is provided. The screen 141, which is of asbestos or other suitable heat-resisting material, preferably is of arcuate cross section as shown in the drawings and is mounted at one end of a bent lever 142. The bent lever 142 is pivotally connected adjacent its bend on a bracket 143 supported by the burner table 131. The other end of the bent lever 142 is connected by means of an adjustable connecting rod 144 and an arm 145 to a rocking shaft 146 pivotally mounted in the brackets 136. A cam rocker arm 147 is secured to this rocking shaft 146 and carries at its outer end a cam roller 148 bearing against the surface of a cam 149. A tension spring 150 is connected at one end to the cam rocker arm 147 and at its other end to a suitable stationary member (for example to the under surface of the table 33) in a manner to urge the cam rocker arm toward the cam 149. The cam 149, like the cam 139, is mounted on the cam drive shaft 69. As the cam 149 rotates, the cam rocker arm 147 is actuated in a manner to cause the fire shield 141 to be elevated and lowered.

The cam 149, being mounted on the cam drive shaft 69, makes one revolution for each complete cycle in the operation of the chuck assembly 55, and hence is easily configured in a manner to cause the fire shield 141 to operate in timed relation with operation of the chuck. Preferably, the cam 149 is so configured that as soon as a group of tubes to be sealed has been moved into position before the burners, the shield 141 is elevated to expose the tubes to the heat of the burner flames, and as soon as the sealing operation is completed, the burner shield 141 is lowered into position before the burners to protect the metal parts from the heat of the flames.

Advantageously, the burner shield 141 is so configured and positioned with respect to the receptacle 113 as to serve when in the lowered position, as a continuation of the front wall 124 of this receptacle. Such arrangement of the burner shield minimizes the chance of such severed ends falling into operating parts of the machine by providing a barrier cooperating with the front wall of the receptacle 113 to guide such severed ends into the receptacle.

Machines embodying the features of the invention have proven successful for sealing glass tubes. Tubes sealed on machines constructed in accordance with the invention are characterized by seals of uniformly high quality, both with respect to appearance and mechanical strength. The percentage of tubes sealed on machines according to the invention that must be rejected for reason of faulty seals is extremely low.

Although a preferred embodiment of the invention has been described above in considerable detail, it is understood that the invention is not limited to the details of the machine specifically described and shown in the drawings, but instead many modifications in design and construction may be made without departing from the scope of the invention.

I claim:

1. Apparatus adapted for sealing glass tubes comprising tube receptacles, tube receptacle advancing means operatively connected with said tube receptacles, a burner operatively positioned with respect to said receptacles, means for intermittently actuating said tube receptacle advancing means in a manner such that each tube receptacle in succession is advanced into position before the burner, is held in position before the burner for a sufficient length of time for sealing a tube positioned therein, and is then withdrawn from before the burner, a chuck adapted to grip the upper ends of glass tubes positioned in said tube receptacles held before the burner, and means for actuating said chuck in timed relation with said tube receptacle advancing means in such manner as to cause the chuck to grip the upper ends of such tubes after the tubes have been held before the burner for a sufficient length of time to have become softened.

2. Apparatus adapted for sealing glass tubes comprising a tube receptacle, a burner, means for advancing the tube receptacle into position before the burner and for holding it in such position for a sufficient period of time to effect sealing of a tube positioned therein, a chuck, and means for causing the chuck to grip the upper end of a tube positioned in the tube receptacle after the tube receptacle has been in position before the burner for a sufficient period of time for a glass tube therein to have become softened.

3. Apparatus adapted for sealing glass tubes comprising a tube receptacle, a burner, means for advancing the tube receptacle into position before the burner and for holding it in such position for a sufficient period of time to effect sealing of a tube positioned therein, a chuck, means for causing the chuck to grip the upper end of a tube positioned in the tube receptacle after the tube receptacle has been in position before the burner for a sufficient period of time for a portion of a tube therein to have become heated and softened, and means for elevating the chuck with the upper end of such tube gripped therein, whereby the heated and softened portion of the tube is drawn for sealing.

4. Apparatus adapted for sealing glass tubes comprising a tube receptacle, a burner, means for advancing the tube receptacle into position before the burner and for holding it in such position for a sufficient period of time to effect sealing of a tube positioned therein, a chuck, means for causing the chuck to grip the upper end of a tube positioned in the tube receptacle after the tube receptacle has been in position before the burner for a sufficient period of time for a portion of a tube therein to have become heated and softened, means for elevating the chuck with the upper end of such tube gripped therein, whereby the heated and softened portion of the tube is drawn for sealing, and means for elevating the burner in timed relation with elevation of the chuck in a manner to heat and fuse the drawn portion of such tube.

5. Apparatus adapted for sealing glass tubes comprising a tube receptacle, a burner, means for advancing the tube receptacle into position before the burner and for holding it in such position for a sufficient period of time to effect sealing of a tube positioned therein, means for rotating a tube positioned in the receptacle while the receptacle is in position before the burner, whereby a tube positioned in such receptacle is heated substantially uniformly about its circumference, a chuck, means for causing the chuck to grip the upper end of a tube positioned in the tube receptacle after the tube receptacle has been in position before the burner for a sufficient period of time for a portion of a tube therein to have become heated and softened, means for elevating the chuck with the upper end of such tube gripped therein, whereby the heated and softened portion of the tube is drawn for sealing, means for elevating the burner in timed relation with elevation of the chuck so as to heat and fuse said drawn portion in a manner to effect sealing of the tube and separation of the main body thereof from the upper end gripped in the chuck, and means for thereafter releasing said upper end from the chuck.

6. In apparatus of the character described, a chain drive mechanism, and a plurality of tube receptacles operatively connected with said mechanism, said tube receptacles each comprising a back portion for connection with the mechanism and a front portion, said front portion having at least a portion of a tube-receiving opening formed therein, and said front portion being recessed with respect to said back portion in a manner to expose a portion of a tube positioned in said tube-receiving opening.

7. In apparatus of the character described, a tube receptacle, means for drawing off the end of a tube being sealed while the tube is in position in said tube receptacle, and means for both rotating a tube positioned in said tube receptacle and for holding the tube in position within the tube receptacle against the force exerted on the tube as the end thereof is drawn off comprising a belt having a facing of relatively soft elastic material such that the soft facing will conform to a portion of the surface of a tube positioned in said tube receptacle, said belt being mounted in such manner that the facing thereon is adapted frictionally to engage a tube positioned in the tube receptacle, and means for driving the belt in a manner to rotate a tube with which the belt facing engages, whereby a tube positioned in the tube receptacle is rotated by the belt and is held in position within the tube receptacle against a force imparted to the tube along the longitudinal axis thereof tending to remove the tube from said receptacle.

8. In apparatus of the character described, a tube receptacle adapted to receive a glass tube, said receptacle being recessed in a manner to expose a portion of a tube positioned therein, means for drawing off the end of a tube being sealed while the tube is in position in said tube receptacle, and means for both rotating a tube positioned in said receptable and for holding the tube in position within the tube receptacle against the force exerted on the tube as the end thereof is drawn off comprising a pair of spaced pulleys, an endless belt mounted on said pulleys, a facing of relatively soft elastic material secured to the outer surface of said belt such that the soft facing will conform to a portion of the surface of a tube positioned in said receptacle, said belt being mounted on said pulleys in a manner such that the belt facing is adapted to enter the recess formed in the tube receptacle and engage frictionally with a tube positioned therein, whereby a tube positioned in the receptacle is held in position against a force imparted to the tube along the longitudinal axis thereof tending to withdraw the tube from the receptacle, and means for driving one of the pulleys and the belt mounted thereon in a manner to cause rotation of a tube with which the belt facing engages.

9. In apparatus of the character described, tube receptacles, a burner, tube receptacle advancing means for advancing the tube receptacles successively into position before the burner, a drive shaft, means for actuating the tube advancing means from the drive shaft, a chuck adapted to grip the upper end of a tube positioned in a tube receptacle before the burner, and means actuated by said drive shaft for actuating the chuck in timed relation with actuation of the tube advancing means.

10. In apparatus of the character described, tube receptacles, a burner, means for advancing the tube receptacles into position before the burner, a chuck mounted for vertical movement in alignment with a tube receptacle in position before the burner and adapted to close in a manner to grip the upper end of a tube positioned in such tube receptacle, cam means for lowering and raising the chuck in vertical alignment with a tube receptacle in position before the burner, and means for causing the chuck to close when in a lowered position.

11. In apparatus of the character described, tube receptacles, a burner, tube advancing means for advancing the tube receptacles successively into position before the burner, a drive shaft, positive drive means for actuating said tube advancing means from said drive shaft, a chuck mounted for vertical movement over a tube receptacle in position before the burner and adapted to close in a manner to grip the upper end of a tube positioned in such tube receptacle, cam means for lowering and elevating the chuck in vertical alignment with a tube receptacle in position before the burner, a cam shaft for actuating said cam means, and positive drive means connecting said cam shaft with the drive shaft in a manner to enable operation of the chuck in timed relation with operation of the tube advancing means.

12. In apparatus of the character described, a chuck assembly comprising a stationary guide plate, a chuck back plate mounted for vertical motion on said guide plate, a chuck front plate connected to said back plate, and cam means for imparting vertical motion to said chuck back plate.

13. In apparatus of the character described, a chuck assembly comprising a stationary guide plate, a chuck back plate mounted for vertical motion on said guide plate, a chuck front plate hingedly connected to said back plate, chuck jaws in said chuck front and back plates, and spring means urging said chuck front plate toward said chuck back plate in a manner to close said chuck jaws.

14. In apparatus of the character described, a chuck assembly comprising a guide plate, a chuck back plate mounted for back and forth motion on said guide plate, means for imparting back and forth motion to said chuck back plate, a chuck front plate hingedly connected to and movable with said chuck back plate, complementary chuck jaws in said chuck front and back plates, spring means urging said chuck front and back plates together in a manner to close said jaws, and means for separating said chuck front and back plates in a manner to open said chuck jaws at appropriate points in the cycle of back and forth motion of the chuck.

15. In apparatus of the character described, a chuck assembly comprising a guide plate, a chuck back plate mounted for back and forth motion on said guide plate, means for imparting such back and forth motion to said chuck back plate, a chuck front plate hingedly connected to and movable with said chuck back plate, complementary chuck jaws on said chuck front and back plates, spring means urging said chuck front and back plates together in a manner to close said chuck jaws, and means for separating said chuck front and back plates in a manner to open said chuck jaws as the chuck is moved toward one of its limits of travel and for releasing said front and back plates from their so-separated positions in a manner to permit closure of the chuck jaws when the chuck is proximate to that limit of travel.

16. In apparatus of the character described, a chuck assembly comprising a guide plate, a chuck back plate mounted for back and forth motion on said guide plate, means for imparting such back and forth motion to said chuck back plate, a chuck front plate hingedly connected to and movable with said chuck back plate, complementary chuck jaws on said chuck front and back plates, spring means urging said chuck front and back plates together in a manner to close said chuck jaws, means for separating said chuck front and back plates in a manner to open said chuck jaws as the chuck is moved toward one of its limits of travel and for releasing said back and front plates from their so-separated positions in a manner to permit closure of the chuck jaws when the chuck is proximate to that limit of travel, means for separating the chuck front and back plates in a manner to open the chuck jaws when the chuck is in the vicinity of its other limit of travel.

17. In apparatus of the character described, a chuck assembly comprising a guide plate, a chuck back plate mounted for vertical motion on said guide plate, means for imparting such motion to said back plate between upper and lower limits of travel, a chuck front plate hingedly secured to and movable with said back plate, complementary chuck jaws in said chuck front and back plates, spring means urging said front and back plates together in a manner to close said jaws, and means for opening said jaws comprising a dog mounted on said guide plate and having a cam surface formed thereon, and a member mounted for engagement with the chuck front plate and adapted to engage with the cam surface of the dog as the chuck moves toward its lower limit of travel in a manner to separate the chuck front and back plates so as to open the chuck jaws, said dog and said member being so arranged with respect to each other that as the chuck moves upwardly from its lower limit of travel the dog and member are separated from position for operative engagement, whereby the chuck front and back plates are released from their separated position relative to each other in a manner to permit closure of the chuck jaws.

18. In apparatus of the character described, a chuck assembly comprising a guide plate, a chuck back plate mounted for back and forth motion on said guide plate, means for imparting such back and forth motion to said back plate, a chuck front plate hingedly connected to and movable with said back plate, and complementary chuck jaws mounted in said front and back plates, said jaws each comprising a jaw block mounted in a recess formed in the chuck plate in which it is mounted, and spring means urging each of the jaw blocks toward its complementary jaw.

19. In apparatus of the character described, a chuck assembly comprising a guide plate, a chuck back plate mounted for back and forth motion on said guide plate, means for imparting such back and forth motion to said back plate, a chuck front plate hingedly connected to and movable with said back plate, and complementary chuck jaws for gripping glass tubes mounted in said front and back plates, said jaws each comprising a jaw block mounted in a recess formed in the chuck plate in which it is mounted, each jaw block having a concavely curved surface facing toward its complementary jaw, said concave surface being curved to a radius greater than the radius of the largest tube intended to be gripped therein with the greatest depth of the curved surface adjacent the center thereof no greater than the radius of the smallest tube intended to be gripped, the lower edge of said curved surface being beveled in a manner to facilitate initial engagement of the jaw block with a tube to be gripped, and spring means urging each jaw block toward its complementary jaw.

20. In apparatus of the character described, including a chuck adapted to grip the upper ends of tubes to be sealed and to hold and subsequently release such tube ends after they have been severed from the bodies of such tubes, means for catching the severed tube ends upon release thereof from the chuck comprising a carriage, a receptacle mounted on said carriage, and means for moving the carriage in a manner to advance the receptacle into position under the chuck prior to release of the severed tube ends from the chuck and for withdrawing the carriage from position under the chuck subsequent to release of the severed ends from the chuck.

21. In apparatus of the character described, the combination of a chuck mounted for vertical motion between upper and lower limits of travel and adapted to grip the upper ends of tubes to be sealed and to hold and subsequently release such tube ends after they have been severed from the bodies of such tubes, chuck actuating means for moving said chuck between its upper and lower limits of travel, and means for catching the severed tube ends upon release thereof from the chuck comprising a carriage, a receptacle mounted on said carriage, and carriage actuating means for moving said carriage in a manner such that the receptacle is advanced into position beneath the chuck to catch severed tube ends when the chuck is in the vicinity of its upper limit of travel prior to release of severed tube ends and is withdrawn from such position beneath the chuck while the chuck is still in the vicinity of the upper limit of travel but subsequent to release of the severed tube ends from the chuck, said carriage actuating means being so connected with the chuck actuating means as to insure operation of the carriage and receptacle in timed relation with the operation of the chuck.

22. In apparatus adapted for sealing glass tubes, including a chuck adapted to grip the upper ends of tubes being sealed and to be elevated in a manner to draw the tubes so gripped in the course of the sealing operation, and chuck actuating mechanism, a burner assembly comprising a burner block mounted to pivot about an axis thereof, a burner mounted on said burner block approximately at right angles to said axis of pivot, a cam, and link mechanism including a cam rider bearing on said cam connected to said burner, said cam and link mechanism being arranged and operated in a manner to rock said burner block about its axis of pivot so as to elevate and lower said burner at appropriate points in the course of the sealing operation, and said cam being connected with said chuck actuating mechanism in a manner to insure elevation and lowering of the burner in timed relation with operation of the chuck.

23. In apparatus adapted for sealing glass tubes and including burners, a fire shield of flame-resistant material adapted to be elevated and lowered, and means for actuating said shield in a manner such that the shield is lowered into position before the burners between successive tube-sealing operations, and is elevated and held out of the way of the burners during progress of sealing operations.

24. In apparatus adapted for sealing glass tubes including a burner, and tube-advancing means for advancing tubes to be sealed into position before the burner, for holding such tubes in such position during progress of a sealing operation, and for withdrawing sealed tubes from such position, a pivoted arm, a fire shield of flame-resistant material mounted on said arm and adapted upon actuation of the arm to be swung into and out of position before the burner, a cam, and link mechanism including a cam rider bearing on said cam connected to said arm, said cam and link mechanism being arranged and operated in a manner to actuate said arm to lower the fire shield into position before the burner during advance and withdrawal of tubes into and from position before the burner, and to elevate and hold said shield out of the way of the burner during progress of a sealing operation, said cam being connected with said tube-advancing means in such manner as to insure operation of the fire shield in timed relation with operation of the tube-advancing means.

25. Apparatus for sealing glass tubes comprising tube receiving means, a burner, means for bringing the tube receiving means and the burner into sealing position relatively to one another and for holding them in such relative position for a sufficient period of time to effect sealing of a tube positioned in said tube receiving means, means for gripping and drawing off the upper end of a tube positioned in the tube receiving means after the tube receiving means has been in sealing position relatively to the burner for a sufficient period of time for a tube in the tube receiving means to have become softened, and means for causing relative axial rotation between the main body portion of the tube and the portion thereof gripped in the gripping means as the latter portion is drawn from the former portion in effecting sealing of the tube.

26. Apparatus for sealing glass tubes comprising tube receiving means, a burner, means for bringing the tube receiving means and the burner into sealing position relatively to one another and for holding them in such relative position for a sufficient period of time to effect sealing of a tube positioned in said tube receiving means, vertically movable means for gripping and drawing off the upper end of a tube positioned in the tube receiving means after the tube receiving means has been in sealing position relatively to the burner for a sufficient period of time for a tube in the tube receiving means to have become softened, and means for causing relative axial rotation between the main body portion of the tube and the portion thereof gripped in the gripping means as the latter portion is drawn from the former portion in effecting sealing of the tube.

27. Apparatus for sealing glass tubes comprising tube receiving means, a burner, means for bringing the tube receiving means and the burner into sealing position relatively to one another and for holding them in such relative position for a sufficient period of time to effect sealing of a tube positioned in said tube receiving means, means for rotating the main body portion of such tube in the tube receiving means while it is in sealing position before the burner, and vertically movable means for gripping and drawing off the upper end of such tube after it has been in sealing position before the burner for a sufficient period of time to have become softened, said gripping means serving to hold the upper portion of the tube gripped therein from rotation as it is drawn off from the rotating main body portion of the tube in effecting sealing thereof.

28. Apparatus for sealing glass tubes comprising tube receiving means, a burner, means for bringing the tube receiving means and the burner into sealing position relatively to one another and for holding them in such relative position for a sufficient period of time to effect sealing of a tube positioned in said tube receiving means, a chuck, means for causing the chuck to grip the upper end of a tube positioned in the tube receiving means, and means for causing the chuck to draw off the upper end of such tube while the tube receiving means is in sealing position relatively to the burner, but only after the tube receiving means has been in such position for a sufficient period of time for a tube therein to have become softened.

29. In apparatus of the character described, tube receiving means, a burner, means for bringing the tube receiving means and the burner into sealing position relatively to one another, a chuck adapted to close in a manner to grip the upper end of a tube positioned in the tube receiving means, and means for separating the chuck from the tube receiving means along the axis of a tube positioned therein while the chuck and tube receiving means are in sealing position relatively to one another and to the burner, whereby the chuck may draw off the upper end of a tube positioned in the tube receiving means while the latter is in sealing position before the burner.

EDWARD THEMAK.

DISCLAIMER 2,270,152.—*Edward Themak*, Northport, N. Y. TUBE SEALING. Patent dated January 13, 1942. Disclaimer filed May 13, 1943, by the inventor.

Hereby enters this disclaimer to claim 29 of said patent.

[*Official Gazette June 15, 1943.*]